UNITED STATES PATENT OFFICE.

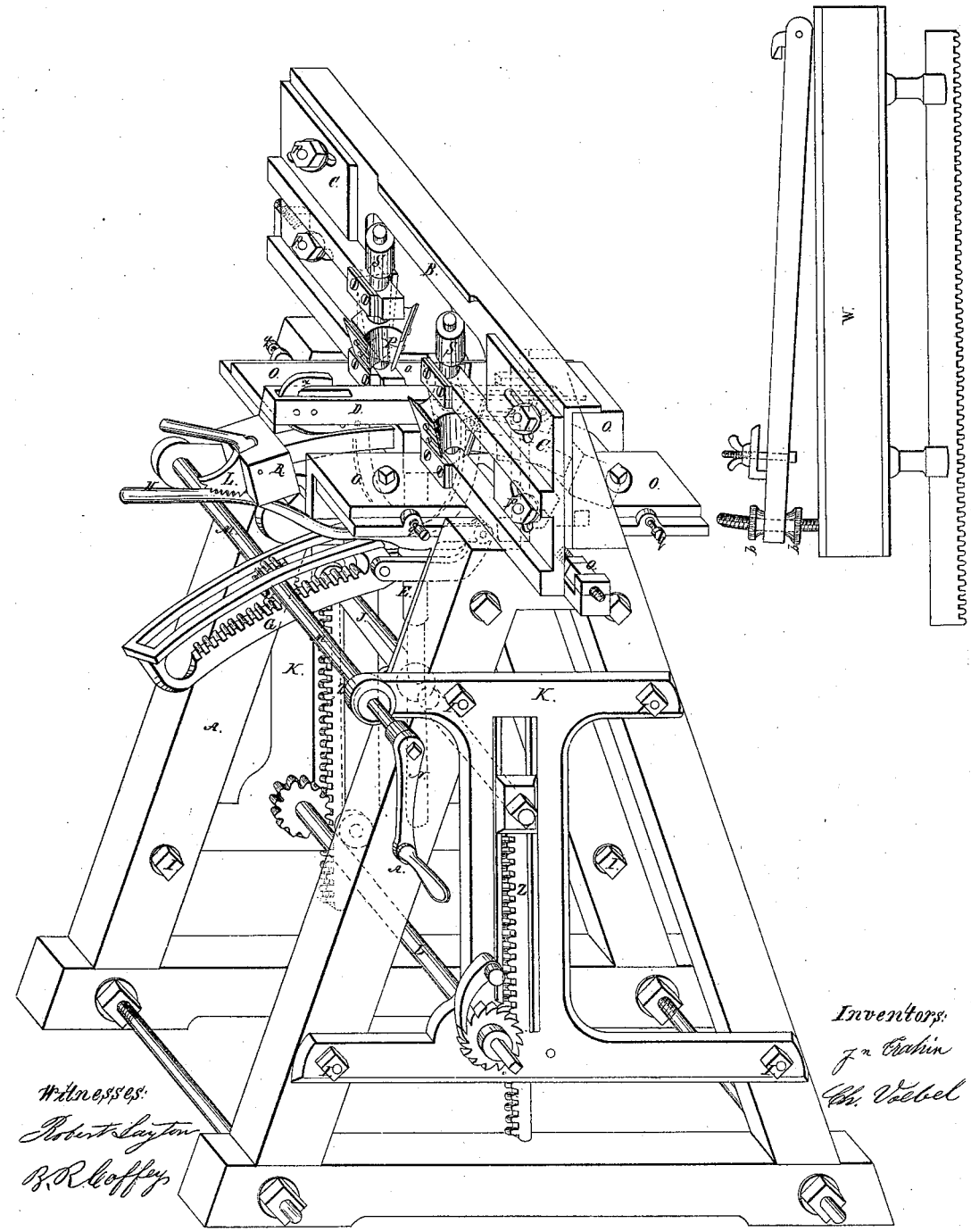
Trahin & Voebel,
Jointing Staves.
N° 17,946.   Patented Aug. 4, 1857.
Witnesses:
Robert Layton
B. R. Coffey
Inventors:
J. n Trahin
Ch. Voebel

J. TRAHIN AND C. VOEBEL, OF NEW ORLEANS, LOUISIANA.

MACHINE FOR BEVELING STAVES, &c.

Specification of Letters Patent No. 17,946, dated August 4, 1857.

*To all whom it may concern:*

Be it known that we, JEAN TRAHIN and CHARLES VOEBEL, of the fourth district of the city of New Orleans, State of Louisiana, have invented a new and useful Machine for Framing and Joining Barrel and Cistern Staves, and do hereby declare that the following is a full and exact description thereof, to wit:

The letter B represents the top part of the machine fastened by the screws $a$, $a$, to the wooden frame marked A, A.

The letters C C are the part of the machine supporting the planes, and is attached by the screws $p$, $p$, $p$, $p$, and the planes can be moved two ways, 1st, horizontally, by the nuts Q Q; 2d, circularly, by the turn point on the back part of the under shaft box. These two motions will effect any position of the planes, and give any square to correspond with them. The planes P P work by endless straps, placed around the pulleys marked S S (on sketch No. 1).

The letter D represents the bed plate (on which the stave rests,) and the letters $x$ $x$, the hooks which hold the staves. By raising the lever, H, the hooks open to receive the stave, and by pressing the lever down the hooks shut down and hold the stave firm.

The part of the machine marked F, is a tooth circular, and is to keep the hooks, $x$ $x$, in their proper position, while the machine is in operation, and is made eccentric to answer the difference of the thickness of the stave wanted. To place another stave in the same position, it is only necessary to press down the lever H, and E, the tooth circular, will move (or raise) itself.

The letter D is one piece on the upper part of which rests the stave.

L is the turn shaft.

F, is the upright bar, with its connections and can be made longer or shorter by turning the shaft L second to the bottom, so as to suit the size of the barrel required and give more or less belly (or curve) to the barrel, in two different ways—1st, through the adjusting screw $w$ (on sketch No. 1;) 2d, through those on both sides with the tooth bar Z Z which seizes the tooth wheel on the shaft L. Furthermore, Z Z are connected with the shaft J, supported by the pieces K K and K K through the screws $i$ $i$, which are screwed to the frame work.

M, is the shaft with a tooth wheel in its middle which seizes the curved tooth bar G, and G therewith connects F by $e$ so that by turning of the shaft M, through the crank N, to the right or left, causes the bed plate to move with the stave between both planes P P, and forms the stave.

The plates O O, support the curved pieces R and D, and keep them straight and in a regular motion, and the plates O O, are regulated by the screws $q$ $q$.

The necessary alteration to make cistern staves is as follows: Loosen F from G by taking out the screw $e$ (on sketch No. 2). Loosen the screw $w$ on shaft J (on sketch No. 1) and take out F and all that is attached to it, through the back plate of the machine. Then take the piece W (sketch No. 4) and place it between the plates O O (on sk. No. 1) and turn the crank N, to put it in motion. Then place the stave on the bed plate of the piece W, (sk. No. 4) and by turning the nuts $f$, $f$, the bed plate will be raised or lowered, as may be required and any shape of stave wanted may be obtained.

This machine is so arranged it can be made use of in any position or situation.

We do not claim separately any essential features in the machine described hereinbefore, but merely their specific arrangement, as shown and described for the purposes set forth.

JEAN TRAHIN.
CH. VOEBEL.

Witnesses:
R. R. COFFEY,
ROBERT LAYTON.